United States Patent
Kang et al.

(10) Patent No.: US 7,307,392 B2
(45) Date of Patent: Dec. 11, 2007

(54) METHOD AND APPARATUS FOR PROCESSING THE OUTPUT SIGNAL OF AN ENCODER

(75) Inventors: Kyung-pyo Kang, Suwon-si (KR); Hyoung-It Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 551 days.

(21) Appl. No.: 10/892,204

(22) Filed: Jul. 16, 2004

(65) Prior Publication Data

US 2005/0012481 A1    Jan. 20, 2005

(30) Foreign Application Priority Data

Jul. 16, 2003    (KR) .................. 10-2003-0048648

(51) Int. Cl.
*H02P 1/00*    (2006.01)
(52) U.S. Cl. ................ 318/268; 318/605; 318/661; 318/254
(58) Field of Classification Search .............. None
See application file for complete search history.

(56) References Cited

U.S. PATENT DOCUMENTS

| | | | | |
|---|---|---|---|---|
| 3,896,299 | A | * | 7/1975 | Rhodes .................... 708/4 |
| 4,266,176 | A | * | 5/1981 | Fulton .................... 318/801 |
| 4,312,030 | A | | 1/1982 | Byers |
| 5,162,798 | A | * | 11/1992 | Yundt .................... 341/116 |
| 5,623,520 | A | * | 4/1997 | Kaiser .................... 375/343 |
| 5,676,147 | A | * | 10/1997 | Petrofsky et al. .......... 600/447 |
| 6,354,691 | B1 | | 3/2002 | Uchikata |
| 6,492,911 | B1 | * | 12/2002 | Netzer .................... 340/870.37 |
| 6,525,530 | B1 | * | 2/2003 | Jansson et al. .......... 324/207.17 |
| 6,762,714 | B2 | * | 7/2004 | Cohen et al. .......... 342/357.12 |
| 6,831,578 | B2 | * | 12/2004 | Krueger et al. .......... 341/143 |
| 2004/0257023 | A1 | * | 12/2004 | Tamisier et al. .......... 318/632 |
| 2005/0024044 | A1 | * | 2/2005 | Poirier et al. .......... 324/207.25 |

FOREIGN PATENT DOCUMENTS

| | | |
|---|---|---|
| JP | 9-1797 | 1/1997 |
| JP | 10-315559 | 12/1998 |
| JP | 2000-141803 | 5/2000 |
| KR | 87-18824 | 12/1987 |

OTHER PUBLICATIONS

Office Action issued by the Korean Patent Office in Application No. 10-2003-0048648 dated Feb. 25, 2005.

* cited by examiner

*Primary Examiner*—Lincoln Donovan
*Assistant Examiner*—Renata McCloud
(74) *Attorney, Agent, or Firm*—Staas & Halsey LLP

(57) ABSTRACT

An apparatus for processing a signal output by an encoder, including a frequency multiplication unit to repeatedly multiply each of frequencies of two sinusoidal signals with a phase difference of approximately 90 degrees by a predetermined number a predetermined number of times; a converter to convert each pair of the two frequency-multiplied sinusoidal signals into square wave signals; and a processor to receive the square wave signals and count a number of rising and/or falling edges of the square wave signals in order to determine and control a position of an object to be controlled.

25 Claims, 5 Drawing Sheets

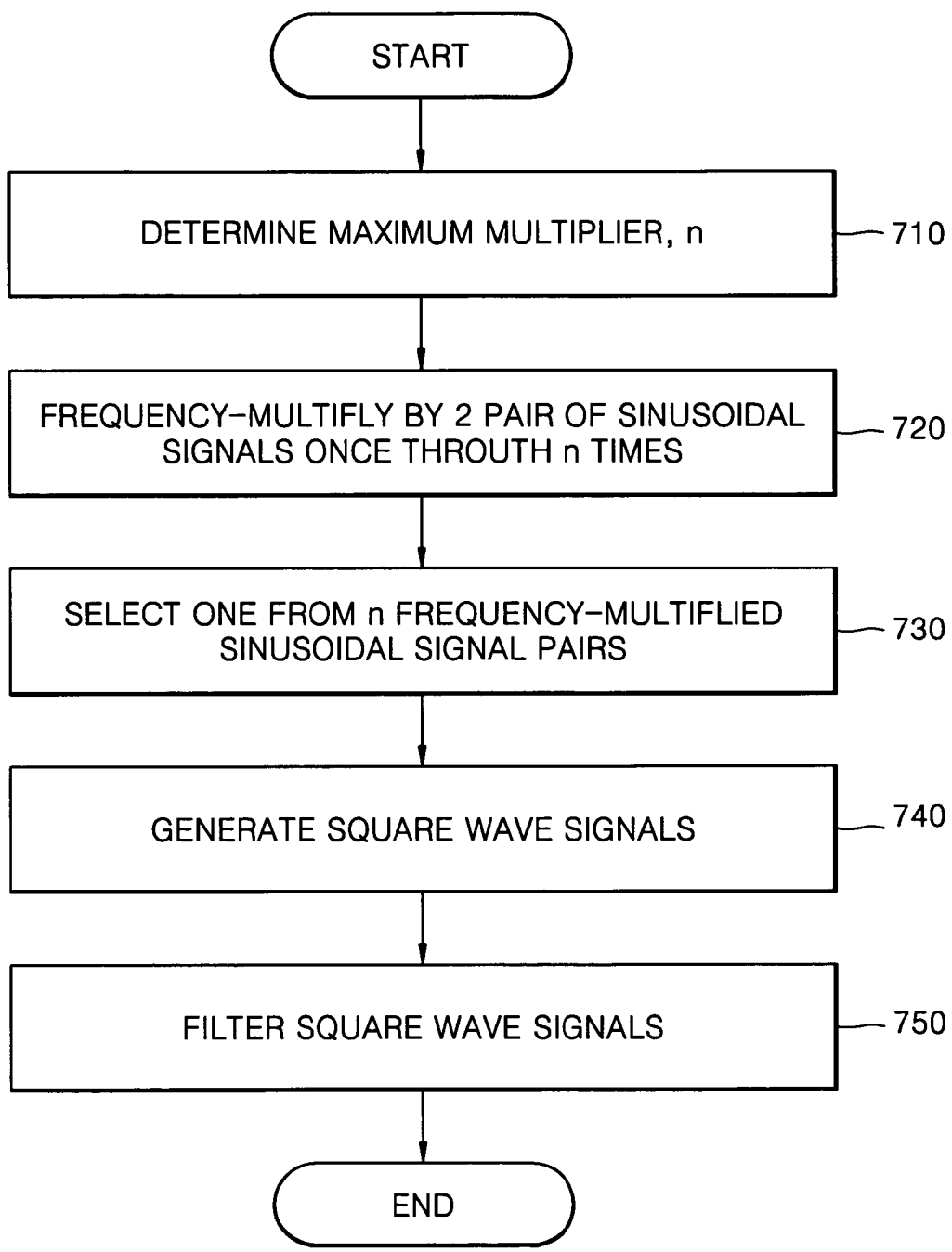

METHOD AND APPARATUS FOR PROCESSING THE OUTPUT SIGNAL OF AN ENCODER

CROSS-REFERENCE TO A RELATED APPLICATION

This application claims the priority of Korean Patent Application No. 2003-48648, filed on Jul. 16, 2003, in the Korean Intellectual Property Office, the disclosure of which is incorporated herein in its entirety by reference.

BACKGROUND OF THE INVENTION

1. Field of the Invention

The invention relates to a motor control, and more particularly, to a signal processing method and apparatus for improving the speed and the position resolutions of an encoder output signal when the motor control is performed using an analog output encoder.

2. Description of the Related Art

In conventional ink jet imaging apparatuses, a recording medium is carried therein using at least one feed roll along a carry path. To form an image accurately on the recording medium, the recording medium must be placed at a specific location. To position the recording medium at the specific location, the feed roll must move with high precision. Hence, the quality of an image is often very dependent upon precise control of the position of the feed roll. An encoder is typically used to precisely control the position of a feed roll.

An encoder typically uses at least one sensor to sense slits that are position marks and formed along the track of a code wheel, for example, a disk. Preferably, the code wheel has a central shaft in alignment with the central shaft of a feed roll and rotates with a rotation of the feed roll. When the code wheel rotates, the number of slits by which the sensor and its accompanying elements pass is counted. Since each of the slits indicates movement of the code wheel at a predetermined angle, changes in the position of the recording medium carried by the feed roll can be tracked.

A square-wave pulse encoder cannot obtain distinct position information between rising and falling edges of a square-wave pulse output by the encoder. Hence, an analog output encoder is used because fine position information can be obtained even during one cycle by finely dividing the angles of rotation of a motor by analog values. To increase a resolution of an analog output encoder, a code wheel is enlarged, or the interval between adjacent slits is reduced. However, if the code wheel is enlarged, the analog output encoder becomes large and bulky. If the interval between adjacent slits is reduced, an encoder output signal is highly likely to be unstabilized due to the characteristics of the electrical circuit of a sensor, the sensitivity of the sensor, and the mechanical and optical characteristics of the code wheel.

Also, to increase the resolution of an analog output encoder, a signal processing circuit is used, in which a sinusoidal signal output by the analog output encoder is divided into $2^n$ sections according to the resolution of analog-to-digital conversion, that is, according to the number of bits, n, and an instantaneous value is read out from each of the $2^n$ sections so that analog-to-digital conversion is performed. However, in this method, numerical errors and jitters often occur on the curve of the sinusoidal signal due to the characteristics of the sinusoidal signal in that only about $\pi/4$ of a half-period maintains linearity, and, accordingly, a processor using an analog-to-digital converted signal cannot precisely control the location or speed of a recording medium. Also, because the sections sequentially undergo the analog-to-digital conversion, delay time is generated, and a load on the processor increases. Such problems adversely affect other signal processing operations performed in the processor.

SUMMARY OF THE INVENTION

One aspect of the invention provides a method of and an apparatus for processing a signal output by an encoder, in which sinusoidal signals having different phases, which are output by the encoder, are frequency-multiplied, and the frequency-multiplied sinusoidal signals are converted into square-wave signals, and a position controlling system which adopts the signal processing apparatus and method so as to precisely control the position or speed of a to-be-controlled object.

According to an aspect of the invention, there is provided a method of processing a signal output by an encoder, includes: repeatedly performing an operation n times (where n is an integer equal to or greater than 1), by which each of frequencies of a pair of first and second sinusoidal signals is multiplied by 2, wherein the first and second sinusoidal signals are provided by the encoder and the second sinusoidal signal is substantially 90 degrees out of phase with the first sinusoidal signal; selecting one pair of n pairs of frequency-multiplied sinusoidal signals in response to a control signal and converting the selected frequency-multiplied sinusoidal signal pair into square wave signals.

According to another aspect of the invention, there is provided an apparatus for processing a signal output by an encoder, including a frequency multiplication unit repeatedly performing an operation n times (where n is an integer equal to or greater than 1), by which each of frequencies of a pair of first and second sinusoidal signals is multiplied by 2, wherein the first and second sinusoidal signals are provided by the encoder and the second sinusoidal signal is substantially 90 degrees out of phase with the first sinusoidal signal; and an analog-to-digital converter converting each of n pairs of frequency-multiplied sinusoidal signals obtained by the frequency multiplication unit into square wave signals According to an aspect of the invention, there is provided a position or speed controlling system including: a frequency multiplication unit repeatedly performing an operation n times (where n is an integer equal to or greater than 1), by which each of frequencies of a pair of first and second sinusoidal signals is multiplied by 2, wherein the first and second sinusoidal signals are provided by the encoder and the second sinusoidal signal is substantially 90 degrees out of phase with the first sinusoidal signal; an analog-to-digital converter selecting one pair of the n pairs of frequency-multiplied sinusoidal signals obtained by the frequency multiplication unit in response to a control signal and converting the selected frequency-multiplied sinusoidal signal pair into square wave signals; and a controller controlling the position or speed of a to-be-controlled object by counting pulses of square wave signals provided by the analog-to-digital converter.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 7 is a flowchart illustrating a method of processing a signal output by an encoder, according to an aspect of the invention.

DETAILED DESCRIPTION OF THE PREFERRED EMBODIMENTS

Figure 1A:
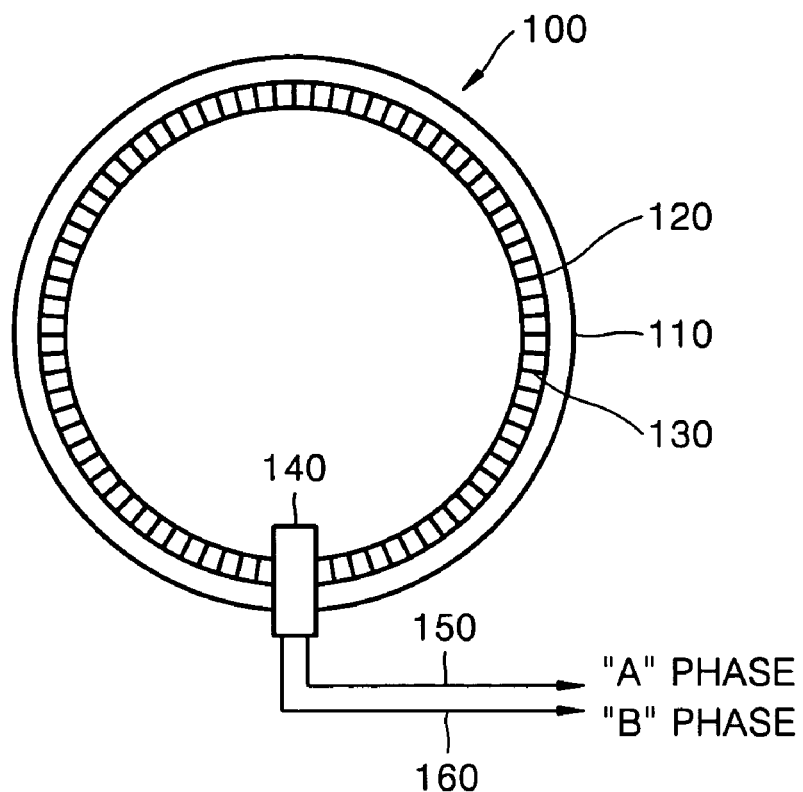
FIGS. 1A and 1B are perspective views of an encoder to which the invention is applied.

Reference will now be made in detail to the embodiments of the invention, examples of which are illustrated in the accompanying drawings, wherein like reference numerals refer to the like elements throughout. The embodiments are described below to explain the invention by referring to the figures.

FIG. 1A is a perspective view showing major elements of an encoder 100 to which the invention has been applied. Various types of encoders can be used as the encoder 100, such as a rotary encoder used to detect the rotation angle of a disk attached to a rotating shaft for carrying a print medium of a printer, or a linear encoder used to detect the moving distance of a print head that moves linearly.

Referring to FIG. 1A, slits 130 are formed on a track 120 at regular intervals in a radial shape. The track 120 is installed on the outer circumference of a disk 110 connected to a rotation shaft of a motor (not shown). A light emitting diode (not shown) is disposed at one side of the slits 130, and a plurality of light receiving diode (not shown) are disposed at the other side of the slits 130. The light emitting diode and the light receiving diodes form a sensor 140. Light from the light emitting diode passes through the slits 130 and falls upon the light receiving diodes. When the disk 110 rotates, a different amount of sinusoidal current flows in the light receiving diodes depending on the intensity of light that the light receiving diodes have received. The sensor 140 changes the sinusoidal current to a voltage and generates an A phase sinusoidal signal 150 and a B phase sinusoidal signal 160, wherein the B phase sinusoidal signal is approximately 90 degrees out of phase with the A phase sinusoidal signal 150.

Figure 1B:
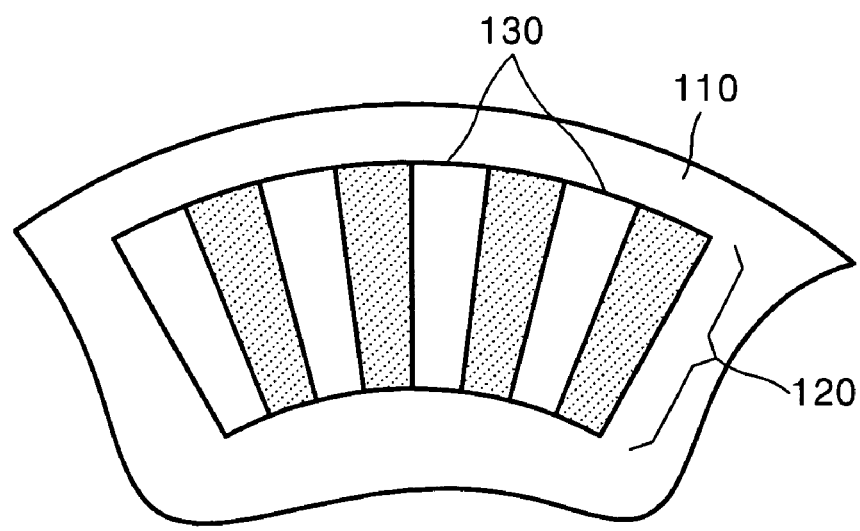

FIG. 1B is a partially magnified view of the disk 110 of FIG. 1A. Referring to FIG. 1B, the track 120 includes the plurality of slits 130 arranged at regular intervals. Each of the slits 130, for example, is mostly translucent and has substantially a trapezoid shape. The sensor 140 discerns the slits 130 by producing an output corresponding to the amount of light transmitted by the translucent slits 130. If the number of slits 130 arranged on one track is M, the period of each of the A and B phase sinusoidal signals 150 and 160 is 1/M. The shape of the slits is not limited to the substantially trapezoidal shape.

Figure 2:
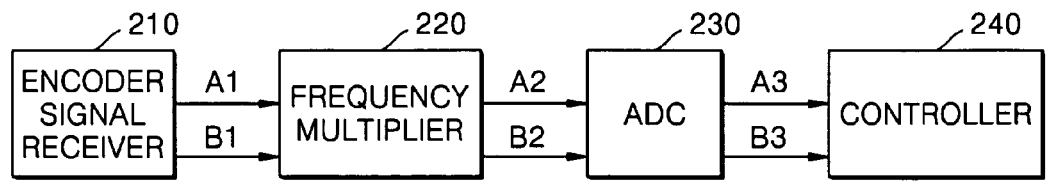
FIG. 2 is a block diagram of a structure of an apparatus for processing a signal output by an encoder, according to an aspect of the invention.

FIG. 2 is a block diagram of a structure of an apparatus for processing a signal output by an encoder, according to a first aspect of the invention. Referring to FIG. 2, this apparatus includes an encoder signal receiver 210, a frequency multiplier 220, an analog-to-digital converter (ADC) 230, and a controller 240.

The encoder signal receiver 210 receives an A phase sinusoidal signal A1 and a B phase sinusoidal signal B1 from the encoder 100 of FIG. 1. The frequency multiplier 220 receives the A-phase and B-phase sinusoidal signals A1 and B1 from the encoder signal receiver 210 and multiplies the frequency of each of them by a predetermined integer to generate sinusoidal signals A2 and B2. In the first aspect of the invention, the predetermined number used to generate sinusoidal signals A2 and B2 is 2.

The ADC 230 receives the sinusoidal signals A2 and B2 from the frequency multiplier 220 and performs an analog-to-digital conversion on each sinusoidal signal to generate square wave signals A3 and B3.

The controller 240 receives the square wave signals A3 and B3 from the ADC 230, counts the number of rising and/or falling edges, that is, pulses of the square wave signals A3 and B3, to determine the current position or speed of a to-be-controlled object, and feeds the determined position or speed value back to the encoder 100.

The frequency multiplier 220, the ADC 230, and the controller 240 may be integrated as one chip using an Application Specific Integrated Circuit (ASIC).

The detailed structures of the frequency multiplier 220 and the ADC 230 are described in detail below with reference to FIGS. 3 and 4, and the operations thereof are described with reference to the waveforms of FIGS. 5A through 5D.

Figure 3:
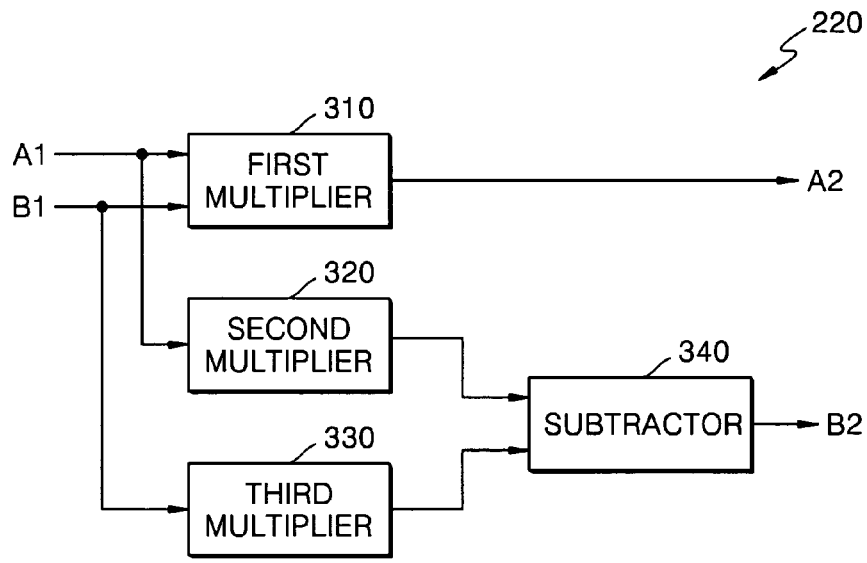
FIG. 3 is a block diagram of a structure of the frequency multiplier of FIG. 2.

FIG. 3 is a block diagram of a structure of the frequency multiplier 220 of FIG. 2. The frequency multiplier 220 includes first, second, and third multipliers 310, 320, and 330 and a subtractor 340. The invention may include more or less than three multipliers and one subtractor.

Figure 5A:
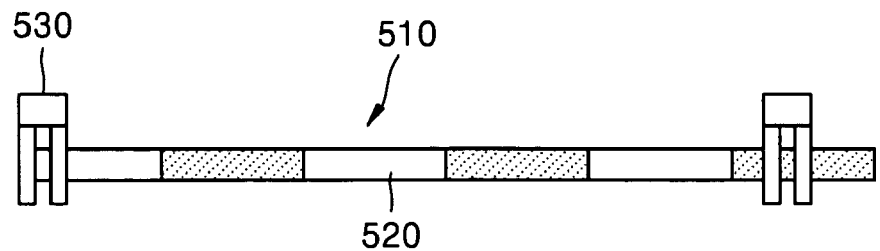
FIGS. 5A through 5D show waveforms of outputs of the portions shown in FIGS. 2 through 4.
Figure 5B:
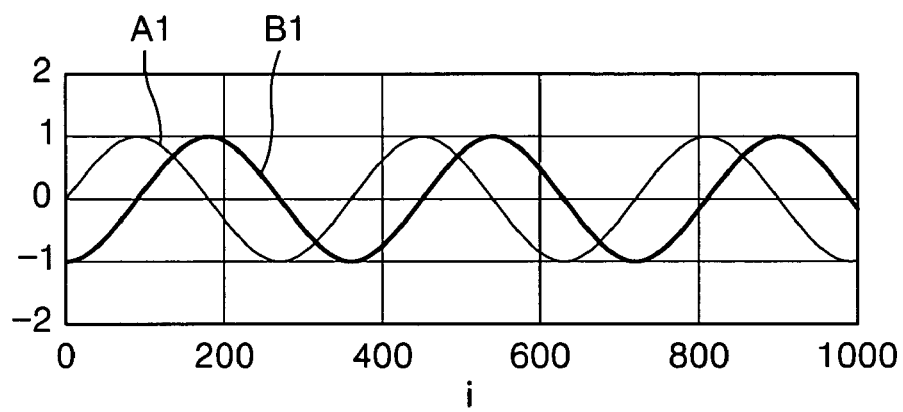

As shown in FIGS. 5A and 5B, if the sensor 530 detects a phase angle of $\phi$ while moving over slits 520 along a track 510, the A phase sinusoidal signal A1 can be expressed as sin ($\phi$), and the B phase sinusoidal signal B1 can be expressed as sin ($\phi-\pi/2$), that is, $-\cos(\phi)$.

Figure 5C:
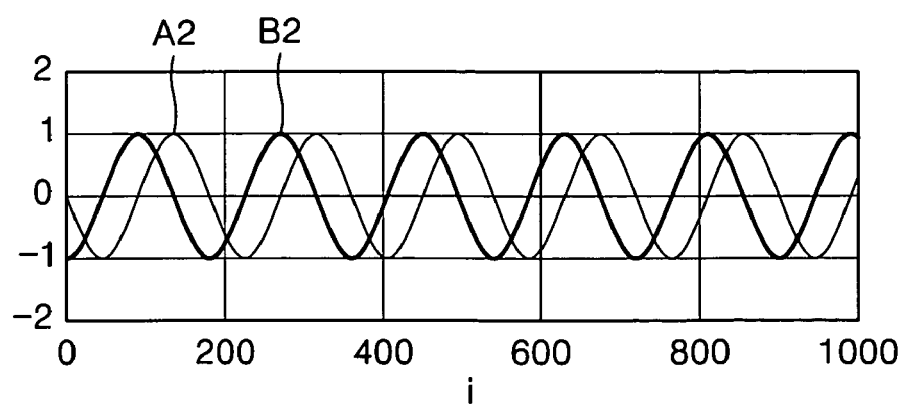

The first multiplier 310 multiplies the frequencies of the A-phase and B-phase sinusoidal signals A1 and B1 shown in FIG. 5B and received from the encoder signal receiver 210 by a predetermined valve, for example, 2 to generate the sinusoidal signal A2 shown in FIG. 5C and defined as in Equation 1:

$$A2 = 2(A1)(B1) = 2\sin(\phi)(-\cos\phi) = -\sin(2\phi) \quad (1)$$

The second multiplier 320 multiplies the frequency of the A-phase sinusoidal signal A1 shown in FIG. 5B and received from the encoder signal receiver 210 by itself and provides the product of $\sin(\phi)^2$ to the subtractor 340. The third multiplier 330 multiplies the frequency of the B-phase sinusoidal signal B1 shown in FIG. 5B and received from the encoder signal receiver 210 by itself and provides the product of $\cos(\phi)^2$ to the subtractor 340.

The subtractor 340 subtracts the output of the second multiplier 320 from that of the output of the third multiplier 330 to generate the sinusoidal signal B2 shown in FIG. 5C and as defined in Equation 2:

$$B2 = \cos(\phi)^2 - \sin(\phi)^2 = \cos(2\phi) \quad (2)$$

The sinusoidal signals A2 and B2 output by the first multiplier 310 and the subtractor 340, respectively, have half of the periods of and the same amplitudes as the sinusoidal signals A1 and B1 received from the encoder signal receiver 210. In other words, the sinusoidal signals A2 and B2 have frequencies that are double the frequencies of the sinusoidal signals A1 and B1.

Figure 4:
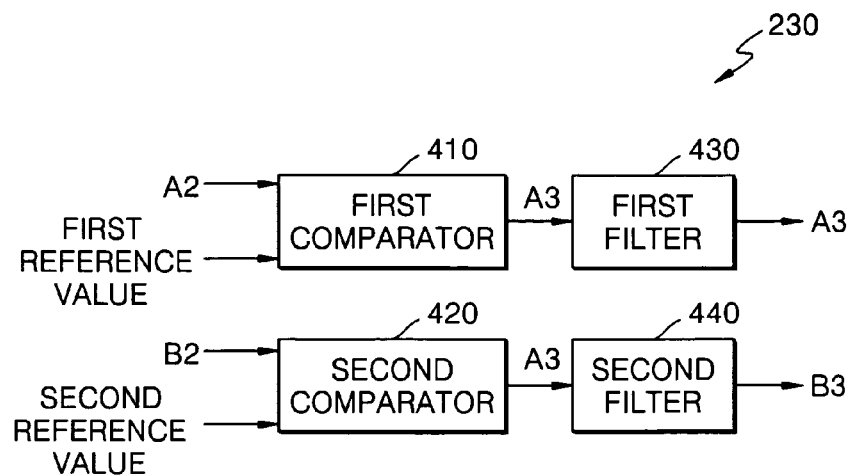
FIG. 4 is a block diagram of a structure of the analog-to-digital converter of FIG. 2.
Figure 5D:
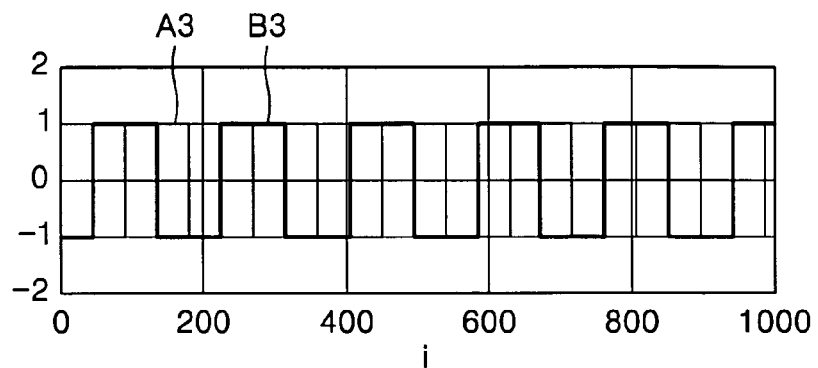

FIG. 4 is a block diagram of a structure of the ADC 230 of FIG. 2, including first and second comparators 410 and 420 and first and second filters 430 and 440. Referring to FIG. 4, the first comparator 410 compares the amplitude of the sinusoidal signal A2 received from the frequency multiplier 220 with a first reference value (e.g., 0), which is a value half way between the maximum amplitude (e.g., +1) and minimum amplitude (e.g., −1) of the sinusoidal signal A2 in order to produce, for example, a digital signal with a duty of 50%. The first comparator 410 outputs a "+1" signal when the sinusoidal signal A2 is greater than the first reference value, and a "−1" signal when the sinusoidal signal A2 is smaller than the first reference value, thereby generating the square wave signal A3, as shown in FIG. 5D.

The second comparator 420 compares the sinusoidal signal B2 received from the frequency multiplier 220 with a second reference value (e.g., 0), which is a value half way between the maximum amplitude (e.g., +1) and minimum amplitude (e.g., −1) of the sinusoidal signal B2 in order to produce, for example, a digital signal with a duty of 50%. The second comparator 420 outputs a "+1" signal when the sinusoidal signal B2 is greater than the second reference value, and a "−1" signal when the sinusoidal signal B2 is smaller than the second reference value, thereby generating the square wave signal B3 as shown in FIG. 5D.

The first filter 430 receives the square wave signal A3 from the first comparator 410 and filters the same to remove an unnecessary signal, such as noise, included in it. The second filter 440 receives the square wave signal B3 from the second comparator 420 and filters the same to remove an unnecessary signal, such as, noise, included in it.

Figure 6:
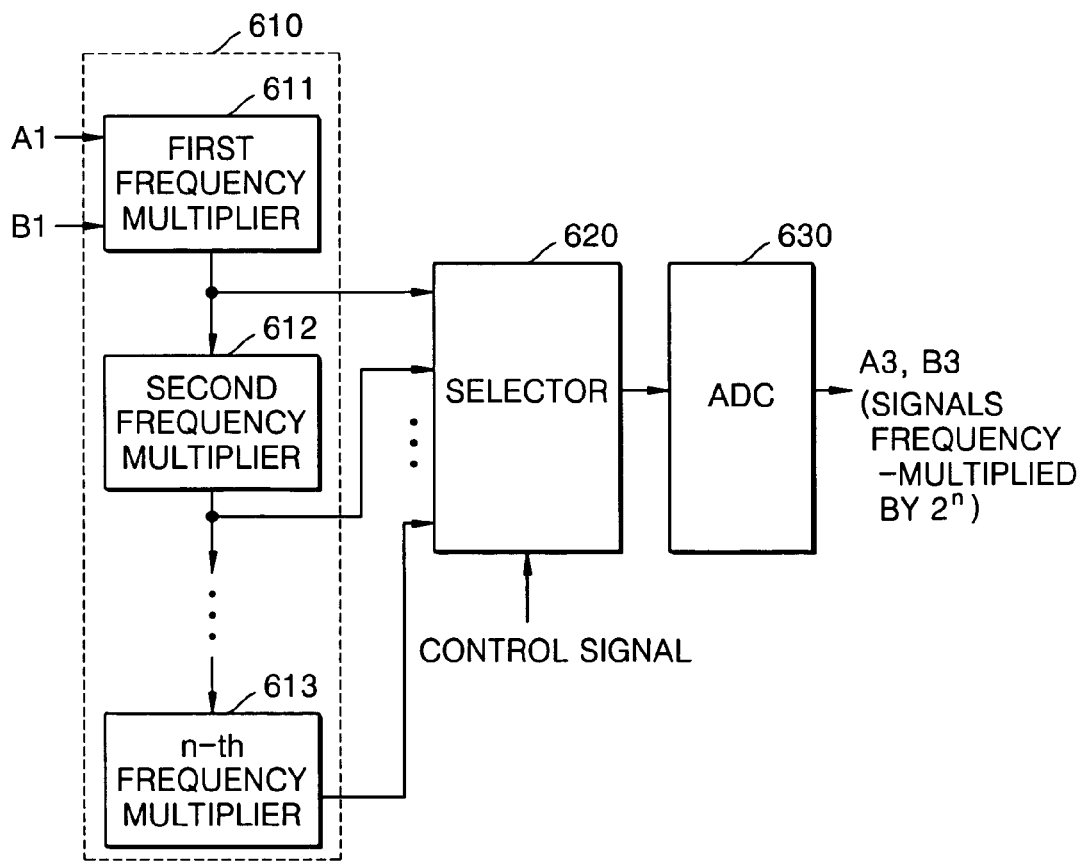
FIG. 6 is a block diagram of a structure of an apparatus for processing a signal output by an encoder, according to another second aspect of the invention.

FIG. 6 is a block diagram of a structure of an apparatus for processing a signal output by an encoder, according to a second aspect of the invention. Referring to FIG. 6, the signal processing apparatus includes a frequency multiplication unit 610, a selector 620, and an ADC 630. The frequency multiplication portion 610 includes first through n-th frequency multipliers 611, 612, and 613.

Each of the first through n-th frequency multipliers 611, 612, and 613 has the same structure as that of the frequency multiplier 220 of FIG. 3 and multiplies frequencies of the received sinusoidal signals by a predetermined integer, such as 2. More specifically, the first frequency multiplier 611 multiplies frequencies of the received sinusoidal signals A1 and B1 by 2 and outputs 2 ($=2^1$) frequency-multiplied sinusoidal signals to the selector 620. The second frequency multiplier 612 receives the frequency-multiplied sinusoidal signals from the first frequency multiplier 611, again multiplies frequencies thereof by 2 and outputs 4 ($=2^2$) frequency-multiplied sinusoidal signals to the selector 620. The n-th frequency multiplier 613 receives $2^{(n-1)}$ frequency-multiplied sinusoidal signals from an (n−1)th frequency multiplier (not shown), again multiplies frequencies thereof by 2, and outputs the $2^n$ frequency-multiplied sinusoidal signals to the selector 620. As described above, the frequency multiplication unit 610 outputs sinusoidal signals obtained by multiplying frequencies of the sinusoidal signals A1 and B1 by $2^1$ through $2^n$ (where n is an integer equal to or greater than 1).

The selector 620 selects one pair of the frequency-multiplied sinusoidal signals received from the frequency multiplication unit 610 in response to a control signal and provides the selected sinusoidal signal pair to the ADC 630. The control signal is produced in various ways. If the control signal includes k bits, one pair can be selected from $2^k$ pairs of frequency-multiplied sinusoidal signals obtained by the frequency multiplication unit 610. At this time, one pair of sinusoidal signals may be selected among the $2^k$ pairs of frequency-multiplied sinusoidal signals obtained by the frequency multiplication unit 610, in proportion with precise control of the location or speed of an object to-be-controlled using the output signal of the encoder 100. In an aspect, when the control signal includes 2 bits and the control of the location or speed of an object to-be-controlled requires a high precision, $2^4$ frequency-multiplied sinusoidal signals may be selected from $2^2$ (=4) pairs of frequency-multiplied sinusoidal signals, that is, $2^1$ through $2^4$ frequency-multiplied sinusoidal signals obtained by the frequency multiplication unit 610.

The ADC 630 has the same structure as the ADC 230 shown in FIG. 4. In this structure, the ADC 630 converts the sinusoidal signals selected by the selector 620 into square wave signals and filters the square wave signals to remove noise or unnecessary signals contained in it.

FIG. 7 is a flowchart illustrating a method of processing a signal output by an encoder, according to an aspect of the invention. Referring to FIG. 7, in operation 710, a maximum multiplier, $2^n$ (where n is an integer equal to or greater than 1), for a pair of sinusoidal signals A1 and B1 provided by the encoder 100 is determined according to the precision of control of the location and/or speed of an object to be controlled using the output signal of the encoder 100.

In operation 720, an operation by which each of frequencies of the two sinusoidal signals A1 and B1 is multiplied by a predetermined integer, such as 2, is repeatedly performed n times, on the basis of the maximum multiplier, $2^n$, for the sinusoidal signals A1 and B1.

In operation 730, one pair is selected from n pairs of sinusoidal signals, that is, $2^1$ through $2^n$ frequency-multiplied sinusoidal signals obtained by multiplying frequencies of the sinusoidal signals A1 and B1 by $2^1$ through $2^n$. In operation 740, the selected frequency-multiplied sinusoidal signals are converted into square wave signals. In operation 750, the square wave signals are filtered and provided to the controller 240 of FIG. 2.

However, if the encoder signal processing method according to the invention does not include operation 730, an operation by which each of frequencies of the two sinusoidal signals A1 and B1 is multiplied by a predetermined integer, such as 2, is repeatedly performed n times, on the basis of the determined maximum multiplier, n. Thereafter, in operations 740 and 750, final $2^n$ frequency-multiplied sinusoidal signals are converted into square wave signals, and the square wave signals are filtered.

In other words, a process in which an operation by which each of frequencies of the sinusoidal signals A1 and B1 are multiplied by 2 is repeatedly performed n times, and final $2^n$ frequency-multiplied sinusoidal signals are converted into square wave signals according to the invention, corresponds to a general n-bit analog-to-digital conversion. To be more specific, an 8-bit analog-to-digital conversion corresponds to a process in which $2^8$ frequency-multiplied sinusoidal signals are converted into square wave signals according to the invention, but the process according to the invention provides a much higher precision, i.e., resolution.

The invention can be embodied as computer readable codes on a computer readable recording medium to be read by a computer. The computer readable recording medium is any data storage device that can store data that can be thereafter read by a computer system. Examples of the computer readable recording medium include read-only memory (ROM), random-access memory (RAM), CD-ROMs, magnetic tapes, floppy disks, optical data storage devices, and so on. Also, the computer readable codes can be transmitted via a carrier wave such as Internet. The computer readable recording medium can also be distributed over network coupled computer systems so that the computer readable code is stored and executed in a distributed fashion. Functional programs, codes, and code segments for accomplishing the invention can be easily construed by programmers in the technical field to which the invention pertains.

In the invention, as described above, an operation by which each of frequencies of two sinusoidal signals with a phase difference of about 90 degrees provided by an encoder are multiplied by a predetermined integer, such as 2, is repeatedly performed n times, and $2^n$ frequency-multiplied sinusoidal signals are converted into square wave signals. The square wave signals are applied to a controller for controlling the location or speed of a to-be-controlled object by using an output signal of the encoder. As a result, it is not necessary to read out $2^n$ instantaneous values for sinusoidal signals output by the encoder according to a resolution (n bits) for an analog-to-digital conversion. Therefore, the load upon the processor is reduced.

Further, the encoder signal processing method and apparatus according to the invention can be applied to various types of encoders, such as, a rotary encoder used to detect the rotation angle of a disk attached to a rotating shaft for carrying a print medium of a printer, or a linear encoder used to detect the moving distance of a print head that moves linearly. Thus, the physical resolution of the encoder can be improved without increasing the number of slits arranged on the disk.

In addition, the encoder signal processing method and apparatus according to the invention can be applied to various types of systems for controlling the location or speed of a to-be-controlled object by using an output signal of the encoder. Thus, the physical resolution of the encoder can be improved without increasing the number of slits arranged on the disk.

Further, because the number of slits arranged on the disk can be reduced according to the invention, it is possible to reduce the radius of the disk of the encoder. Thus, the overall size of the encoder can be reduced, thereby reducing the costs for manufacturing the encoder.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus for processing a signal output by an encoder, each signal comprising a first and second sinusoidal signal formed as a pair, the apparatus comprising:
   a frequency multiplication unit to repeatedly multiply frequency of the first and second sinusoidal signals, the first and second sinusoidal signals having a phase difference of approximately 90 degrees, by a predetermined number a predetermined number of times, into pairs of frequency multiplied sinusoidal signals;
   a converter to convert each pair of frequency multiplied sinusoidal signals into square wave signals; and
   a processor to receive the square wave signals and count a number of rising and/or falling edges of the square wave signals in order to determine and control a position of an object to be controlled.

2. The apparatus for processing the signal output by the encoder as claimed in claim 1, wherein the predetermined number that is multiplied to each of the frequencies of the two sinusoidal signals is 2.

3. The apparatus for processing the signal output by the encoder as claimed in claim 1, wherein each of the frequencies of the first and second sinusoidal signals is repeatedly multiplied by 2 at least once.

4. The apparatus as claimed in claim 1, further comprising a selector that selects a pair of the frequency-multiplied sinusoidal signals according to a control signal and provides the selected pair of frequency-multiplied sinusoidal signals to the converter.

5. The apparatus as claimed in claim 1, wherein the frequency multiplication unit comprises:
   first through n-th frequency multipliers for repeatedly performing an operation by which the frequency of the first and second sinusoidal signals is multiplied by 2, n times.

6. The apparatus as claimed in claim 1, wherein the frequency multiplication unit comprises first through n-th frequency multipliers, wherein each of the first through n-th frequency multipliers comprises:
   a first multiplier multiplying the first and second sinusoidal signals frequency-multiplied by $2^0$ through $2^{n-1}$, by 2, to produce the first sinusoidal signal frequency-multiplied by $2^1$ through $2^n$;
   a second multiplier multiplying the first sinusoidal signal frequency-multiplied by $2^0$ through $2^{n-1}$, by itself;
   a third multiplier multiplying the second sinusoidal signal frequency-multiplied by $2^0$ through $2^{n-1}$, by itself; and
   a subtractor subtracting an output signal of the second multiplier from an output signal of the third multiplier to produce the second sinusoidal signal frequency-multiplied by $2^1$ through $2^n$.

7. The apparatus as claimed in claim 6, wherein the converter comprises:
   a first comparator receiving the first sinusoidal signal frequency-multiplied by $2^1$ through $2^n$ provided from the frequency multiplication unity comparing the first sinusoidal signal frequency-multiplied by $2^1$ through $2^n$ with a first reference value, and generating a first square wave signal; and
   a second comparator receiving the second sinusoidal signal frequency-multiplied by $2^1$ through $2^n$ provided from the frequency multiplication unit, comparing the second sinusoidal signal frequency-multiplied by $2^1$ through $2^n$ with a second reference value, and generating a second square wave signal.

8. The apparatus as claimed in claim 7, wherein the first and second reference values depend on duties of the first and second square wave signals, respectively.

9. The apparatus as claimed in claim 7, wherein the converter further comprises:
   a first filter removing unnecessary signals from the first square wave signal received from the first comparator; and
   a second filter removing unnecessary signals from the second square wave signal received from the second comparator.

10. A position controlling system including an encoder, the system comprising:
   a frequency multiplication unit repeatedly performing an operation n times by which a frequency of each of a pair of first and second sinusoidal signals is multiplied by 2 to form n pair of frequency-multiplied sinusoidal signals, wherein the first and second sinusoidal signals are provided by the encoder as a pair and the second sinusoidal signal is substantially 90 degrees out of phase with the first sinusoidal signal;
   an analog-to-digital converter selecting one pair of the n pairs of frequency-multiplied sinusoidal signals obtained by the frequency multiplication unit according to a control signal and converting the selected pair of frequency-multiplied sinusoidal signals into square wave signals; and
   a controller controlling a position of a to-be-controlled object by counting pulses of square wave signals provided by the analog-to-digital converter.

11. The position controlling system as claimed in claim 10, wherein the frequency multiplication unit comprises:
   first through n-th frequency multipliers for repeatedly performing an operation by which each of the frequencies of the first and second sinusoidal signals is multiplied by 2, n times,
   wherein each of the first through n-th frequency multipliers comprises:
      a first multiplier multiplying the first and second sinusoidal signals frequency-multiplied by $2^0$ through $2^{n-1}$, by 2, to produce the first sinusoidal signal frequency-multiplied by $2^1$ through $2^n$;
      a second multiplier multiplying the first sinusoidal signal frequency-multiplied by $2^0$ through $2^{n-1}$, by itself;
      a third multiplier multiplying the second sinusoidal signal frequency-multiplied by $2^0$ through $2^{n-1}$, by itself; and
      a subtractor subtracting an output signal of the second multiplier from an output signal of the third multiplier to produce the second sinusoidal signal frequency-multiplied by $2^1$ through $2^n$.

12. The position controlling system as claimed in claim 11, wherein the analog-to-digital converter comprises:
   a first comparator receiving the first sinusoidal signal frequency-multiplied by $2^1$ through $2^n$ provided from the frequency multiplication unit, comparing the first sinusoidal signal frequency-multiplied by $2^1$ through $2^n$ with a first reference value, and generating a first square wave signal; and
   a second comparator receiving the second sinusoidal signal frequency-multiplied by $2^1$ through $2^n$ provided from the frequency multiplication unit, comparing the second sinusoidal signal frequency-multiplied by $2^1$ through $2^n$ with a second reference value, and generating a second square wave signal.

13. The position controlling system as claimed in claim 10, wherein n is an integer equal to or greater than 1.

14. A speed controlling system including an encoder, the system comprising:
   a frequency multiplication unit repeatedly performing an operation n times by which a frequency of a first and second sinusoidal signals is multiplied by 2 to form n pairs of frequency-multiplied sinusoidal signals, wherein the first and second sinusoidal signals are provided by the encoder and the second sinusoidal signal is approximately 90 degrees out of phase with the first sinusoidal signal;
   an analog-to-digital converter selecting one pair of the n pairs of frequency-multiplied sinusoidal signals obtained by the frequency multiplication unit according to a control signal and converting the selected pair of frequency-multiplied sinusoidal signals into square wave signals; and
   a controller controlling a speed of a to-be-controlled object by counting pulses of square wave signals provided by the analog-to-digital converter.

15. The speed controlling system as claimed in claim 14, wherein the frequency multiplication unit comprises:
   first through n-th frequency multipliers for repeatedly performing an operation by which the frequency of the first and second sinusoidal signals is multiplied by 2, n times,
   wherein each of the first through n-th frequency multipliers comprises:
      a first multiplier multiplying the first and second sinusoidal signals frequency-multiplied by $2^0$ through $2^{n-1}$, by 2, to produce the first sinusoidal signal frequency-multiplied by $2^1$ through $2^n$;
      a second multiplier multiplying the first sinusoidal signal frequency-multiplied by $2^0$ through $2^{n-1}$, by itself;
      a third multiplier multiplying the second sinusoidal signal frequency-multiplied by $2^0$ through $2^{n-1}$, by itself; and
      a subtractor subtracting an output signal of the second multiplier from an output signal of the third multiplier to produce the second sinusoidal signal frequency-multiplied by $2^1$ through $2^n$.

16. The speed controlling system as claimed in claim 15, wherein the analog-to-digital converter comprises:
   a first comparator receiving the first sinusoidal signal frequency-multiplied by $2^1$ through $2^n$ provided from the frequency multiplication unit, comparing the first sinusoidal signal frequency-multiplied by $2^1$ through $2^n$ with a first reference value, and generating a first square wave signal; and
   a second comparator receiving the second sinusoidal signal frequency-multiplied by $2^1$ through $2^n$ provided from the frequency multiplication unit, comparing the second sinusoidal signal frequency-multiplied by $2^1$ through $2^n$ with a second reference value, and generating a second square wave signal.

17. A method of processing a signal output by an encoder, each signal comprising a first and second sinusoidal signal formed as a pair, the method comprising:
   repeatedly multiplying a frequency of the first and second sinusoidal signals, having a phase difference of approximately 90 degrees, by a predetermined number a predetermined number of times, to form pair of two frequency multiplied sinusoidal signals;
   converting each pair of the two frequency multiplied sinusoidal signals into square wave signals; and
   applying the square wave signals to a processor for determining a position of an object to be controlled according to a number of rising and/or falling edges of the square wave signals, wherein the processor outputs a signal from the encoder.

18. The signal processing method of the encoder as claimed in claim 17, wherein the predetermined number that is multiplied to each of the frequencies of the two sinusoidal signals is 2.

19. The signal processing method of the encoder as claimed in claim 17, wherein each of the frequencies of the two sinusoidal signals is repeatedly multiplied by 2 at least once.

20. The method of processing the signal output by the encoder as claimed in claim 18, wherein the repeatedly multiplying each of frequencies of two sinusoidal signals comprises:

multiplying the first and second sinusoidal signals frequency-multiplied by $2^0$ through $2^{n-1}$, by 2, to produce the first sinusoidal signal frequency-multiplied by $2^1$ through $2^n$;

multiplying the first sinusoidal signal frequency-multiplied by $2^0$ through $2^{n-1}$, by itself;

multiplying the second sinusoidal signal frequency-multiplied by $2^0$ through $2^{n-1}$, by itself; and subtracting the results obtained by multiplying the second sinusoidal signal frequency-multiplied by $2^0$ through $2^{n-1}$, by itself from the results obtained by multiplying the first sinusoidal signal frequency-multiplied by $2^0$ through $2^{n-1}$, by itself, to produce the second sinusoidal signal frequency-multiplied by $2^1$ through $2^n$.

21. The method of processing the signal output by the encoder as claimed in claim 20, wherein the converting each pair of the two frequency multiplied sinusoidal signals into square wave signals comprises:

receiving the first sinusoidal signal frequency-multiplied by $2^1$ through $2^n$, comparing the first sinusoidal signal frequency-multiplied by $2^1$ through $2^n$ with a first reference value, and generating a first square wave signal; and receiving the second sinusoidal signal frequency-multiplied by $2^1$ through $2^n$, comparing the second sinusoidal signal frequency-multiplied by $2^1$ through $2^n$ with a second reference value, and generating a second square wave signal.

22. The signal processing method of the encoder as claimed in claim 17, wherein the signal processing method is applied to a system for controlling a location and/or velocity of the object to be controlled using the output signal of the encoder.

23. The signal processing method of the encoder as claimed in claim 17, further comprising counting a number of rising and/or falling edges of the square wave signals to determine a position and/or velocity of the object to be controlled.

24. The signal processing method of the encoder as claimed in claim 17, further comprising selecting one pair of the frequency-multiplied sinusoidal signals in response to a control signal and converting the selected pair of frequency-multiplied sinusoidal signals into square wave signals.

25. A computer readable recording medium that stores a program sequence for executing a method of processing a signal output by an encoder, each signal comprising two sinusoidal signals formed as a pair, the method comprising:

repeatedly multiplying a frequency of two sinusoidal signals having a phase difference of approximately 90 degrees by a predetermined number a predetermined number of times, to form pair of two frequency multiplied sinusoidal signals;

converting each of the predetermined number of pairs of the two frequency multiplied sinusoidal signals into square wave signals; and applying the square wave signals to a processor for determining a position of an object to be controlled according to a number of rising and/or falling edges of the square wave signals, wherein the processor outputs a signal from the encoder, wherein the predetermined number that is multiplied to each of the frequency of the two sinusoidal signals is 2 and each of the frequencies of the two sinusoidal signals is repeatedly multiplied by 2 at least once.

* * * * *

UNITED STATES PATENT AND TRADEMARK OFFICE
CERTIFICATE OF CORRECTION

PATENT NO. : 7,307,392 B2 Page 1 of 1
APPLICATION NO. : 10/892204
DATED : December 11, 2007
INVENTOR(S) : Kyung-pyo Kang et al.

It is certified that error appears in the above-identified patent and that said Letters Patent is hereby corrected as shown below:

Column 7, Line 63, before "frequency" insert --a--.

Column 8, Line 46, change "unity" to --unit--.

Column 9, Line 6, change "pair" to --pairs--.

Column 9, Line 63, change "freguency" to --frequency--.

Column 10, Line 52, change "pair" to --pairs--.

Column 12, Line 19, change "signals" to --signals,--.

Column 12, Line 20, change "degrees" to --degrees,--.

Column 12, Line 21, change "pair" to --pairs--.

Signed and Sealed this

Fifth Day of August, 2008

JON W. DUDAS
*Director of the United States Patent and Trademark Office*